June 9, 1931.   A. B. DIBNER   1,808,769
TEE CONNECTER
Filed March 5, 1926
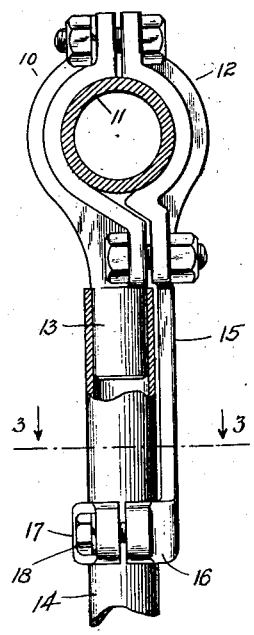
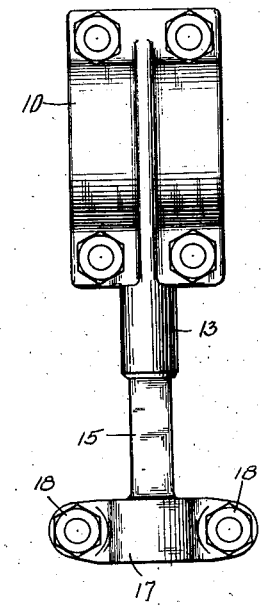
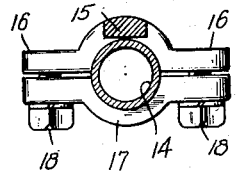
INVENTOR
ABRAHAM BERNARD DIBNER
BY
ATTORNEY Patented June 9, 1931

1,808,769

UNITED STATES PATENT OFFICE

ABRAHAM BERNARD DIBNER, OF NEW YORK, N. Y.

T CONNECTOR

Application filed March 5, 1926. Serial No. 92,502.

My invention relates generally to electrical equipment for high power transmission lines and has reference specifically to what is known commercially as T connectors used essentially for connecting cables, wires and metal tubing on electric structures. The use of T connectors of this character is confined chiefly to outdoor installations which are subject to severe stresses produced by wind and storm, strains brought about by the weight of snow and sleet and also to inherent vibrations of alternating current apparatus including, for example, stresses due to switching and surges.

Means have been devised to take care of connections between the horizontally arranged main conductors and the T connector, which means comprises a split collar adapted to embrace the conductor and to be tightened thereabout by means of suitable nut and bolt connections. The present invention therefore relates more particularly to the connection employed between the horizontally arranged split collar clamp and the vertical branch conductor. Such a connection has been ordinarily effected by means of a rigid short depending shank, which, because of its short length, resulted in great strains being brought to bear on the copper tubing which was set upon the shank and which formed the vertical branch conductor. Continued vibrations and swaying of the tubing caused by weather and other disturbances very soon resulted in a crystallized condition of the tubing at its point of junction to the shank of the T connector. The stresses of course would be primarily concentrated at the circle where the shank terminated, as this would be the point of rupture in case the tube were drawn beyond the limitation of its strength. It is pointed out, however, that ordinarily rupture would occur due to the crystallization at the point referred to.

With the foregoing in mind, it is the purpose of the present invention to provide an arm, preferably integral with the clamp collar of the connector, the arm extending downwardly and provided with means for clasping the dependent tubing at a point substantially beyond the termination of the short shank. It will be clear that such a construction will relieve undue stresses at the junction of the connector and the tube, and still allow for a gap between the termination of the shank and the clasping means itself. It is this gap which permits of a measure of flexibility in the tube between the two holding points thereof, that is to say between the shank and clasping means at the lower end of the arm.

A further object of the invention is to provide a T connector of this character having a depending arm and clasping means, which means comprises a clamping area of sufficient size to assure full electrical functioning through the arm and into the tubing as well as to greatly improve the mechanical clamping efficiency of such a grip.

The invention is illustratively exemplified in the accompanying drawings, in which Figure 1 is an end elevational view of my improved T connector: Figure 2 is a side elevational view of the same: and Figure 3 is a transverse sectional view taken on the line 3—3 of Figure 1.

Referring to the drawings, the T connector comprises a head portion 10 designed to embrace the main horizontal conductor 11 of an electrical installation. The head 10 may be split to include a cap 12 adapted to be adjusted with respect to the main head portion to clamp the conductor 11. This main head portion 10 is provided with a depending short shank 13, preferably cylindrical in shape, and adapted to receive the open end of a vertical conductor 14, the latter being a hard drawn copper tubing which is attached to the shank 13 by means of shrink fitting process commonly used in installations of this character.

Integral with the cap or other portion 12 of the head is an arm 15 which is disposed parallel to the shank 13 and projects to a point substantially below the termination thereof. The free end of the arm is provided with a cross piece 16 which is shaped to embrace one-half the vertical conductor 14, as illustrated in Figure 3, the other half of the conductor being embraced by a clamp piece 17 adjustable with respect to the cross piece 16. This adjustment is effected by means of suitable bolt members 18. It will be clear of course, that the head may be so designed as to include both the shank and arm as integral with one portion of the head. It is also clear that there may be a plurality of members corresponding to pieces 16 and 17 respectively.

The present invention functions as follows: The head portion is clamped to the main conductor in the usual manner and the vertical conductor tubing is arranged over the short shank 13, which leaves a gap of tubing between the end of the shank and the cross piece 16. The cap 17 is then clamped over the tubing conductor to brace the latter and to prevent undue stresses at the junction of the conductor and the tube. The important feature of this construction is the gap between the termination of the shank and the grip itself, such a gap resulting in a measure of flexibility in the tube. As a consequence, the main electrical contact, i. e. the shank surface, is relieved of mechanical stresses, assuring full electrical functioning of the shrink fit contact. It will also be clear that since the cross piece and cap may be of substantially any area the mechanical efficiency of such a grip is assured.

Electrically, my improved connector has the following advantages: The main shrink fit electrical contact suffers from two conditions of uncertainty; first, the large variations in the diameter of commercial tubing allows very little margin of assured and successful contact at the joint; second, shrink fitting necessitates the heating of the tube to increase its size so as to fit over the shank. Heat applied to copper in the open air and by unskilled operators often results in an overheated condition of the tube. Overheating naturally produces a coating of copper oxide over the tube, such oxide being an insulating medium. Therefore a joint wherein the tube has been overheated before being applied on the shank will have introduced into it an insulating film. Similarly the process of heating the tubing for making the joint at the shank anneals the hardened tube thus depriving it of the strength of its original hardened condition thereby inviting failure. The arm grips at a point unannealed and overcomes the weakness introduced in fitting the tube to the shank.

These electrical difficulties are overcome by permitting the arm 15 to carry current and the cap or clasp 17 to distribute this current to the tubing 14. Should any of the above mentioned difficulties be present in a T connector after it is assembled, it can be readily seen that by the presence of the improved arm and clamp, current would travel from contact on the horizontal conductor or head 10 of the T and then directly down through the arm 15 and about the cross piece into the tubing.

My invention provides for multiple points of contact as for example at 13 and 16 so that failure of electrical contact for any of the usual reasons at either point is inconsequential as the invention provides for the continued electrical conductivity through the arm 15 to any of the points of contact as for example 16.

What I claim is:

1. An electric T connector for main and branch conductors, comprising a divided head portion adapted to embrace the main conductor, one section of the head being provided with a shank to fit into the branch conductor, and means integral with the other section of the head and projecting beyond the termination of the shank for clamping said branch conductor.

2. An electric T connector for main and branch conductors, comprising a divided head portion to embrace and contact with said main conductor, one section of the head having a short shank projecting therefrom to fit into the end of the branch conductor, and an arm integral with the other section of the head and projecting parallel to said shank and beyond the termination thereof to overlie a gap in the tubing between the shank and end of the arm, and clamping means carried by said arm at the end thereof to embrace and form an electrical contact between the arm and tube.

3. An electric T connector, as claimed in claim 2, in which the clamping means comprises a cross piece integral with the end of said arm, a clamping piece adjustable with respect to the cross piece and about the branch conductor, and means for adjusting the clamping piece.

4. An electric T connector, for main and branch conductors, having spaced divided contacting means for the branch conductor, one section of the means having a shank to fit into and be sweated to the branch conductor and the other section being provided with an arm, the latter being provided with a strap to embrace the branch conductor and an adjustable strap carried by the first strap and to clamp the conductor.

5. An electric T connector for main and branch conductors having spaced divided contacting means for the branch conductor, one section of said means having a shank to fit into and be sweated to the branch conductor and the other section being provided with an arm, the latter being provided with straps to embrace the branch conductor and adjustable straps carried by the first straps to clamp the conductor, said arm being of sufficient cross-section to carry the flow of current from the main conductor to the branch conductor through any of the auxiliary points of contact.

In testimony whereof he has affixed his signature.

ABRAHAM BERNARD DIBNER.